(12) United States Patent
Wang et al.

(10) Patent No.: US 8,488,004 B2
(45) Date of Patent: Jul. 16, 2013

(54) SYSTEM AND METHOD FOR IDENTIFYING DISCREPANCY OF IMAGE OF OBJECT

(75) Inventors: Guang-Jian Wang, Shenzhen (CN); Xiao-Jun Fu, Shenzhen (CN); Meng-Zhou Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 233 days.

(21) Appl. No.: 13/186,450

(22) Filed: Jul. 19, 2011

(65) Prior Publication Data

US 2012/0133781 A1 May 31, 2012

(30) Foreign Application Priority Data

Nov. 26, 2010 (CN) .......................... 2010 1 0561045

(51) Int. Cl.
*H04N 5/225* (2006.01)
(52) U.S. Cl.
USPC .................................. 348/207.1; 348/222.1
(58) Field of Classification Search
None
See application file for complete search history.

(56) References Cited

U.S. PATENT DOCUMENTS

| | | | |
|---|---|---|---|
| 6,307,963 B1 * | 10/2001 | Nishida et al. | 382/190 |
| 7,362,918 B2 * | 4/2008 | Herley | 382/284 |
| 2004/0246374 A1 * | 12/2004 | Mishima et al. | 348/441 |
| 2007/0040929 A1 * | 2/2007 | Ohno | 348/362 |
| 2007/0229697 A1 * | 10/2007 | Choi | 348/345 |
| 2008/0079842 A1 * | 4/2008 | Aoki et al. | 348/366 |
| 2012/0127326 A1 * | 5/2012 | Wang | 348/207.1 |
| 2012/0140084 A1 * | 6/2012 | Wang et al. | 348/207.1 |
| 2012/0154659 A1 * | 6/2012 | Wang | 348/333.1 |
| 2012/0155760 A1 * | 6/2012 | Wang | 382/167 |
| 2012/0320223 A1 * | 12/2012 | Wu | 348/207.1 |

* cited by examiner

*Primary Examiner* — Roberto Velez
*Assistant Examiner* — Abdelaaziz Tissire
(74) *Attorney, Agent, or Firm* — Altis Law Group, Inc.

(57) ABSTRACT

In a method for identifying discrepancy of a captured digital image of an object, a standard image of the object is obtained. A first difference value between an IAED value of the digital image and an IAED value of the standard image is calculated. Both the two images are divided into N pixel blocks. A second difference value between an IAED value of each pixel block of the digital image and an IAED value of each pixel block of the standard image is calculated. A coefficient T is generated for comparing the digital image and the standard image, and each block of the digital image is compared with each pixel block of the standard image. The same pixel blocks between the digital image and the standard image are eliminated from the digital image, and a discrepant image is generated according to remaining pixel blocks of the digital image.

18 Claims, 4 Drawing Sheets

| Digital image a | | | | | | |
|---|---|---|---|---|---|---|
| A1 | A2 | A3 | | | | |
| | | | | | | |
| | | | | | | |
| | | | | | | |
| | | | | | | |
| | | | | | | An |

| Standard image b | | | | | | |
|---|---|---|---|---|---|---|
| B1 | B2 | B3 | | | | |
| | | | | | | |
| | | | | | | |
| | | | | | | |
| | | | | | | |
| | | | | | | Bn |

FIG. 4

SYSTEM AND METHOD FOR IDENTIFYING DISCREPANCY OF IMAGE OF OBJECT

BACKGROUND

1. Technical Field

Embodiments of the present disclosure relate to image processing technologies, and particularly to a system and method for identifying discrepancy of an image of an object.

2. Description of Related Art

Automatic optical inspection (AOI) devices are widely used to automatically inspect a captured image of an object to be tested, such as a motherboard or a printed circuit board (PCB). The captured image may be compared with a standard image of the object to inspect discrepancy between the two images. In an image inspection method, a plurality of threshold coefficients need to be manually input to the AOI device, which has low accuracy and is time consuming.

BRIEF DESCRIPTION OF THE DRAWINGS

FIG. 4 is a schematic diagram illustrating one example of a digital image and a standard image of the object.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
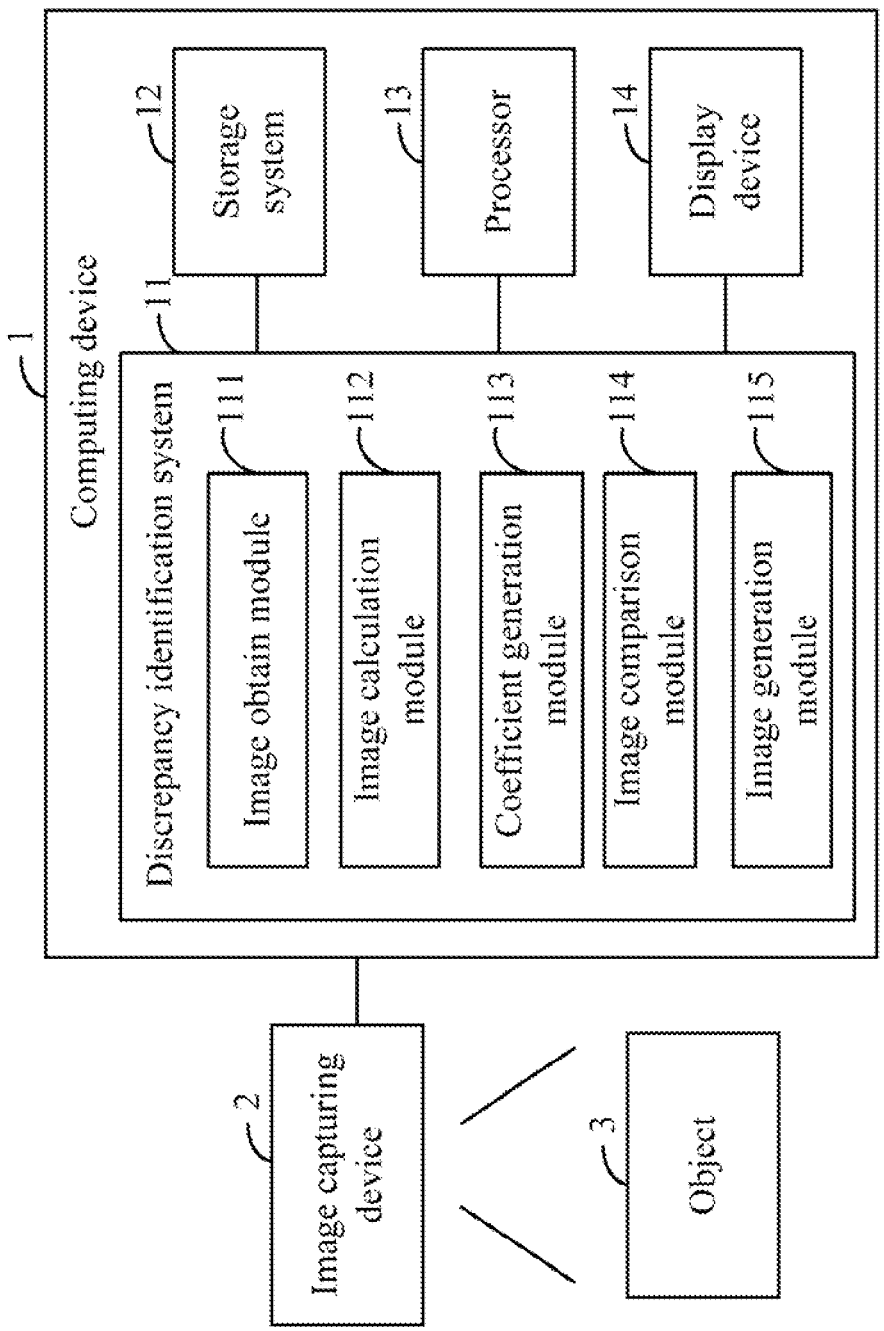
FIG. 1 is a block diagram of one embodiment of a computing device including a discrepancy identification system.
Figure 2:
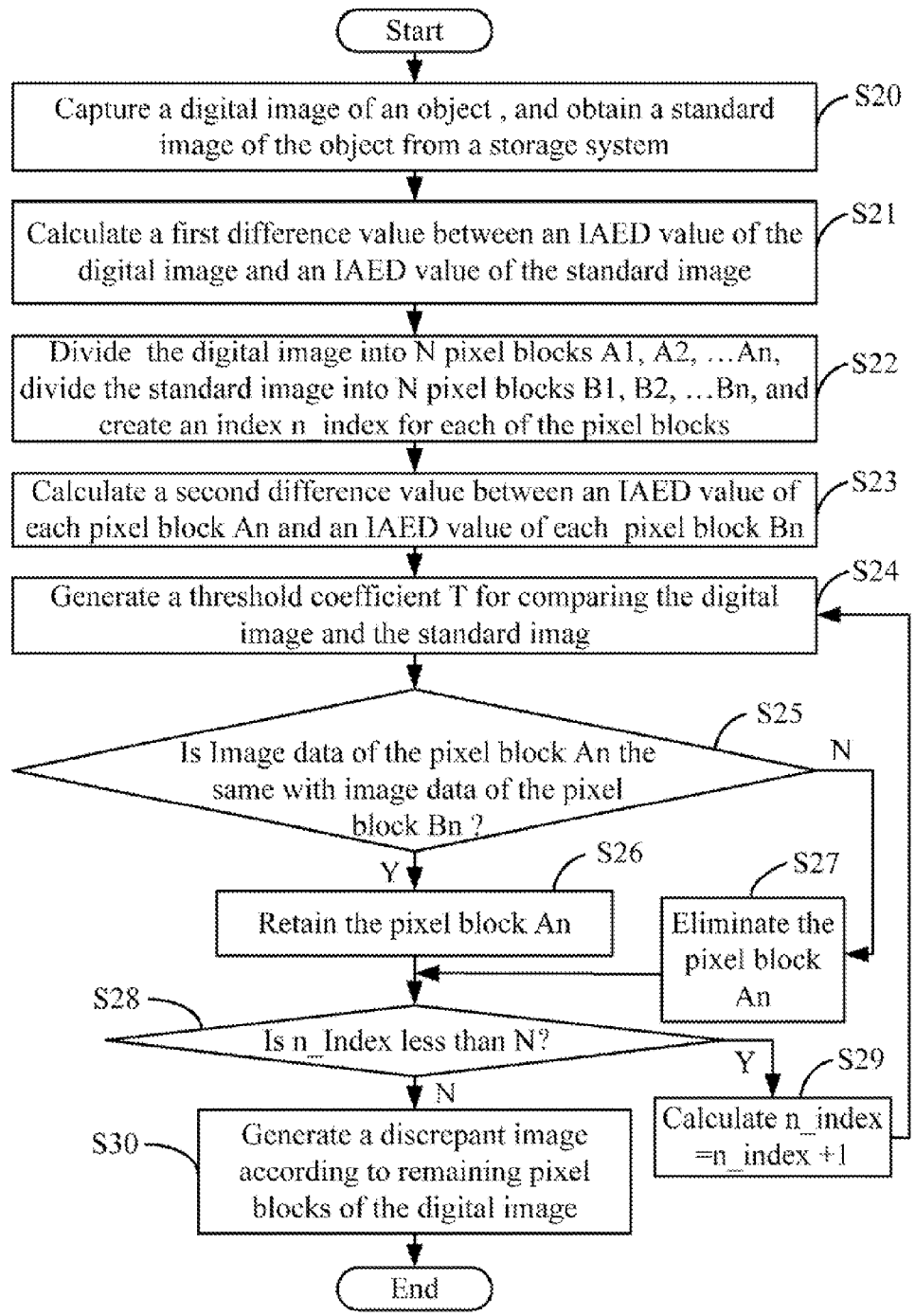
FIG. 2 is one embodiment of a flowchart of a method for identifying discrepancy of an image of an object using the system of FIG. 1.
Figure 4:
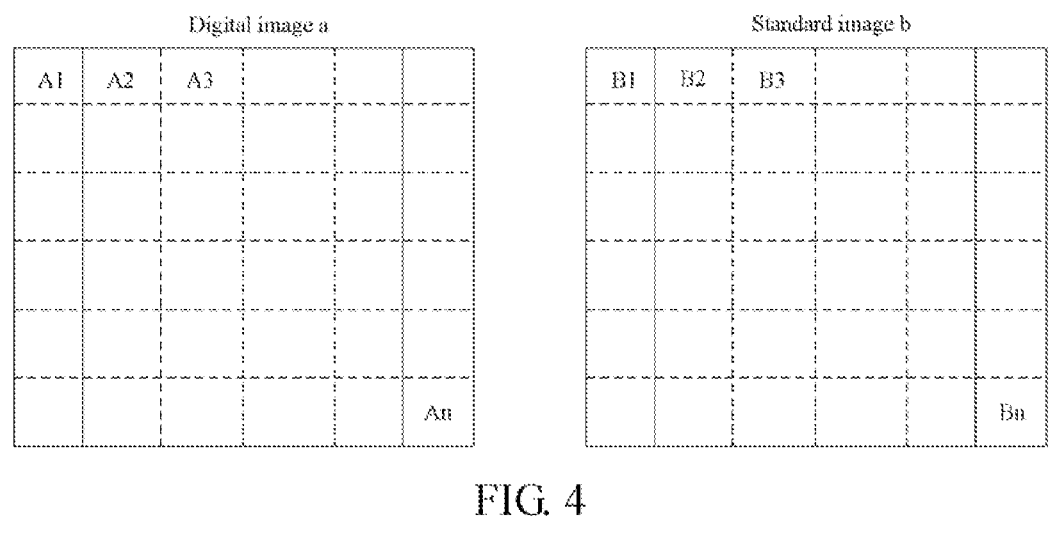

FIG. 1 is a block diagram of one embodiment of a computing device 1 including an discrepancy identification system 11. In the embodiment, the computing device 1 is connected to an image capturing device 2 such as a digital camera. The image capturing device 2 captures a digital image (the digital image "a" as shown in FIG. 4) of an object 3, such as a motherboard of a computer. The computing device 1 may further include a storage system 12, at least one processor 13, and a display device 14. The discrepancy identification system 11 can automatically generate a threshold coefficient for analyzing the digital image and a standard image of the object 3, inspects discrepancy between the two images using the threshold coefficient, and generates a discrepant image of the digital image according to the discrepancy. Details are described below.

The storage system 12 stores a standard image of the object 3 (the standard image "b" as shown in FIG. 4), and one or more programs of the discrepancy identification system 11. The standard image is a reference image of the object 3. The reference image (e.g., ideal image) is an image that may be captured without any external influences, such as light influences, for example. In one embodiment, the storage system 12 may be an internal storage system, such as a random access memory (RAM) for temporary storage of information, and/or a read only memory (ROM) for permanent storage of information. In some embodiments, the storage system 12 may also be an external storage system, such as an external hard disk, a storage card, or a data storage medium.

In one embodiment, the discrepancy identification system 11 includes an image obtaining module 111, an image calculation module 112, a coefficient generation module 113, an image comparison module 114, and an image generation module 115. The modules 111-115 may comprise computerized instructions in the form of one or more programs that are stored in the storage system 12, and executed by the at least one processor 13 to provide functions of the discrepancy identification system 11.

In general, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The image obtaining module 111 is operable to capture a digital image of the object 3 using the image capturing device 2, and to obtain the standard image of the object 3 from the storage system 12. As shown in FIG. 4, the digital image "a" is captured from the object 3 using the image capturing device 2, and the standard image "b" is a reference image of the object 3 that is obtained from the storage system 12.

The image calculation module 112 is operable to calculate an image average energy density (IAED) value of the digital image based on red, green, and blue (RGB) channels of the digital image, and an IAED value of the standard image based on RGB channels of the standard image. In one embodiment, the RGB channels includes a R channel, a G channel, and a B channel. The IAED value includes an IAED value of the R channel, an IAED value of the G channel, and an IAED value of the B channel. The IAED is defined as an image energy density of each pixel of the image having N*N pixels, and is calculated according to a calculation equation IAED=(R+G+B)/N/N, where R represents a pixel value of the R channel, G represents a pixel value of the G channel, and B represents a pixel value of the B channel. The pixel value of the R channel, G channel, or B channel may be an integer number in the range 0 to 255.

One example with respect to FIG. 4, assuming that the digital image has 32*32 pixels which are divided into An pixel blocks, the pixel value of the pixel block A1 based on the RGB channels may be described as R=147248, G=147760, and B=144176. The IAED value of the pixel block A1 is calculated as IAED=(R+G+B)/32/32=428.89. In the embodiment, the image calculation module 112 calculates the IAED value of the R channel of the digital image as IAED_a_R=R/32/32=147248/32/32=143.80, the IAED value of the G channel of the digital image as IAED_a_G=G/32/32=144760/32/32=141.37, and the IAED value of the B channel of the digital image as IAED_a_B=B/32/32=144176/32/32=140.80.

In FIG. 4, assuming that the standard image "b" has 32*32 pixels is divided into Bn pixel blocks, the pixel values of the pixel block Bn based on the RGB channels may be described as R=152179, G=135539, and B=31091. In the embodiment, the image calculation module 112 calculates the IAED value of the R channel of the standard image as IAED_b_R=R/32/32=152179/32/32=148.61, the IAED value of the G channel of the standard image as IAED_b_G=G/32/32=135539/32/32=132.36, and the IAED value of the B channel of the standard image as IAED_b_B=31091/32/32=30.36.

The image calculation module 112 is further operable to calculate a first difference value between the IAED value of the digital image and the IAED value of the standard image.

In the embodiment, the first difference value includes a difference value D_R between the IAED value of the R channel of the digital image and the IAED value of the R channel of the standard image, a difference value D_G between the IAED value of the G channel of the digital image and the IAED value of the G channel of the standard image, and a difference value D_B between the IAED value of the B channel of the digital image and the IAED value of the B channel of the standard image. In one example, the difference value D_R is solved as IAED_a_R minus IAED_b_R=143.80−148.61=−4.81, the difference D_G is solved as IAED_a_G minus IAED_b_G=141.37−132.36=9.01, and the difference D_B is solved as IAED_a_B minus IAED_b_B=140.80−30.36=110.44.

The image calculation module 112 is further operable to divide the digital image into N pixel blocks, such as the pixel blocks A1, A2, ... An of FIG. 4, divide the standard image into N pixel blocks, such as the pixel blocks B1, B2, ... Bn of FIG. 4, and calculate a second difference value between an IAED value of each pixel block An and an IAED value of each corresponding pixel block Bn.

In the embodiment, the image calculation module 112 creates an index (denoted as n_index) for all pixel blocks of the digital image and the standard image, and then calculate the second difference value according to the index. The second difference value includes a difference value D_Rn between the IAED value of the R channel of the pixel block An and the IAED value of the R channel of the pixel block Bn, a difference value D_Gn between the IAED value of the G channel of the pixel block An and the IAED value of the G channel of the pixel block Bn, and a difference value D_Bn between the IAED value of the B channel of the pixel block An and the IAED value of the B channel of the pixel block Bn. In the embodiment, the initial value of the n_index is defined as "1".

The coefficient generation module 113 is operable to generate a threshold coefficient (denoted as "T") for comparing the digital image and the standard image. Details of generating the coefficient are provided in the following descriptions of FIG. 3.

The image comparison module 114 is operable to determine whether image data of the pixel block An is the same with image data of the pixel block Bn by comparing each pixel block An of the digital image with each pixel block Bn of the standard image according to the first difference value, and the second difference value, and the coefficient T. In the embodiment, if at least two inequality of |D_Rn|>T×|D_R|, |D_Gn|>T×|D_G|, and |D_Bn|>T×|D_B| are true, the image data of the pixel block An is determined as the same with the image data of the pixel block Bn. Where |D_R|, |D_G|, |D_B| respectively represents an absolute value of D_R, D_G, and D_B, and |D_Rn|, |D_Gn|, |D_Bn| respectively represents an absolute value of D_Rn, D_Gn, and D_Bn.

The image generation module 115 is operable to eliminate the pixel block An from the digital image when the image data of the pixel block An is different from the image data of the pixel block Bn, and generate a discrepant image according to remaining pixel blocks of the digital image when all of the pixel blocks of the digital image are compared. In addition, the image generation module 115 is further operable to output the generated discrepant image to the display device 14, and store the discrepant image in the storage system 12.

Figure 3:
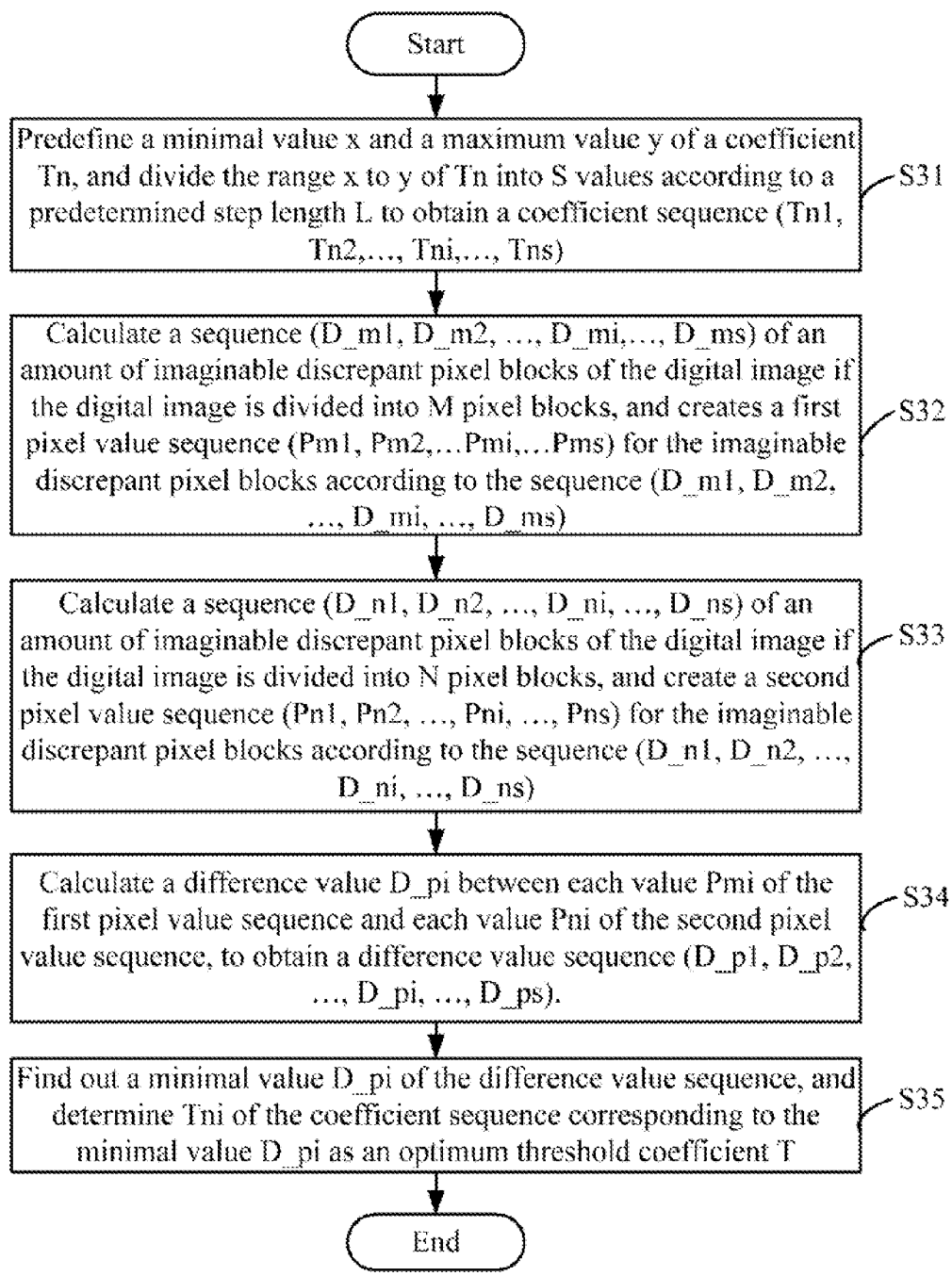
FIG. 3 is a detailed flowchart of S24 in FIG. 2.

FIG. 3 is one embodiment of a flowchart of a method for identifying discrepancy of an image of an object using the system of FIG. 1. In the embodiment, the method generates a threshold coefficient for analyzing a captured digital image and a standard image of the object 3 to inspect discrepancy between the two images, and generate a discrepant image of the digital image according to the discrepancy. Depending on the embodiment, additional blocks may be added, others removed, and the ordering of the blocks may be changed.

In block S20, the image obtaining module 111 captures a digital image of the object 3 using the image capturing device 2, and obtains a standard image of the object 3 from a storage system 12. As shown in FIG. 4, the digital image "a" is captured from the object 3 using the image capturing device 2, and the standard image "b" is a reference image of the object 3 that is obtained from the storage system 12.

In block S21, the image calculation module 112 calculates an image average energy density (IAED) value of the digital image based on RGB (red, green, blue) channels of the digital image, an IAED value of the standard image based on RGB channels of the standard image, and calculates a first difference value between the IAED value of the digital image and the IAED value of the standard image. In one embodiment, the RGB channels include a R channel, a G channel, and a B channel. The IAED value includes an IAED value of the R channel, an IAED value of the G channel, and an IAED value of the B channel. The first difference value includes a difference value D_R between the IAED value of the R channel of the digital image and the IAED value of the R channel of the standard image, a difference value D_G between the IAED value of the G channel of the digital image and the IAED value of the G channel of the standard image, and a difference value D_B between the IAED value of the B channel of the digital image and the IAED value of the B channel of the standard image. Details of calculating the IAED value and the difference value are provided above.

In block S22, the image calculation module 112 divides the digital image into N pixel blocks A1, A2, ... An, divides the standard image into N pixel blocks B1, B2, ... Bn, and creates an index n_index for each of the pixel blocks. In the embodiment, an initial value of the n_index is defined as "1".

In block S23, the image calculation module 112 calculates a second difference value between an IAED value of each pixel block An of the digital image and an IAED value of each corresponding pixel block Bn of the standard image. The second difference value includes a difference value D_Rn between the IAED value of the R channel of the pixel block An and the IAED value of the R channel of the pixel block Bn, a difference value D_Gn between the IAED value of the G channel of the pixel block An and the IAED value of the G channel of the pixel block Bn, and a difference value D_Bn between the IAED value of the B channel of the pixel block An and the IAED value of the B channel of the pixel block Bn.

In block S24, the coefficient generation module 113 generates a threshold coefficient T for comparing the digital image and the standard image. Details of generating the coefficient are provided in the following descriptions of FIG. 3.

In block S25, the image comparison module 114 determines whether image data of the pixel block An is the same with image data of the pixel block Bn by comparing each pixel block An of the digital image with each pixel block Bn of the standard image according to the first difference value, the second difference value, and the coefficient T. In the embodiment, if at least two inequality of |D_Rn|>T×|D_R|, |D_Gn|>T×|D_G|, and |D_Bn|>T×|D_B| are true, the image data of the pixel block An is determined as the same with the image data of the pixel block Bn. Where |D_R|, |D_G|, |D_B| respectively represents a absolute value of D_R, D_G, and D_B, and |D_Rn|, |D_Gn|, |D_Bn| respectively represents a absolute value of D_Rn, D_Gn, and D_Bn.

If the image data of the pixel block is the same with the image data of the pixel block Bn, in block S26, the pixel block An is retained in the digital image. Otherwise, if the image data of the pixel block An is different from the image data of the pixel block Bn, in block S27, the image generation module 115 eliminates the pixel block An from the digital image.

In block S28, the image comparison module 114 determines whether n_index is less than the number N of the pixel blocks of the digital image. If n-index is less than N, block S29 is implemented. Otherwise, if n_index is equal to N, namely that each of the pixel blocks of the digital image is compared, and then block S30 is implemented.

In block S29, the image comparison module 114 calculates n_Index=n_Index+1 to control the index to search for the next pixel block of the digital image, until all the pixel blocks are compared. Then the procedure returns to block S24.

In block S30, the image generation module 115 generates a discrepant image according to the remaining pixel blocks of the digital image. In addition, the image generation module 115 outputs the generated discrepant image to the display device 14, and stores the discrepant image in the storage system 12.

FIG. 3 is a detailed flowchart of block S24 in FIG. 3.

In block S31, the coefficient generation module 113 predefines a minimum value x and a maximum value y of a coefficient Tn, and divides the range x to y of Tn into S values according to a predetermined step length L to obtain a coefficient sequence (Tn1, Tn2, . . . Tni, . . . , Tns), in which $1 \leq i \leq s$. In one embodiment, Tn is greater than or equal to "1" and less than or equal to "N" if the digital image is divided into N pixel blocks. In one example, if the digital image is divided into 30 pixel blocks, the minimum value x may be predefined as "2.0", the maximum value y may be predefined as "30", and the step length L may be predefined as "0.1".

In block S32, the coefficient generation module 113 calculates a sequence (D_m1, D_m2, . . . , D_mi, . . . , D_ms) of an amount of imaginable discrepant pixel blocks of the digital image if the digital image is divided into M pixel blocks, and creates a first pixel value sequence (Pm1, Pm2, . . . Pmi, . . . , Pms) for the imaginable discrepant pixel blocks according to the sequence (D_m1, D_m2, . . . , D_mi, . . . , D_ms), in which D_mi=Tni×M, Pmi=D_mi×M×M. In one embodiment, the discrepant pixel blocks of the digital image is denoted as different from the corresponding pixel blocks of the standard image if the standard image is also divided into M pixel blocks.

In block S33, the coefficient generation module 113 calculates a sequence (D_n1, D_n2, . . . , D_ni, . . . , D_ns) of an amount of imaginable discrepant pixel blocks of the digital image if the digital image is divided into N pixel blocks, and creates a second pixel value sequence (Pn1, Pn2, . . . , Pni, . . . , Pns) for the imaginable discrepant pixel blocks according to the sequence (D_n1, D_n2, . . . , D_ni, . . . , D_ns), in which D_ni=Tni×n, Pmi=D_ni×N×N.

In block S34, the coefficient generation module 113 calculates a difference value D_pi between each value Pmi of the first pixel value sequence and each value Pni of the second pixel value sequence, to obtain a difference value sequence (D_p1, D_p2, . . . , D_pi, . . . , D_ps). In the embodiment, D_pi=Pmi−Pni.

In block S35, the coefficient generation module 113 finds out a minimum value D_pi of the difference value sequence, and determines Tni of the coefficient sequence corresponding to the minimum value D_pi as an optimum threshold coefficient T. In one embodiment, if D_p10 (i.e., the $10^{th}$ difference value of the sequence, i=10) is the minimum value, Tn10 may be determined as the optimum threshold coefficient T, where Tn10=2.0+0.1×10=3.0.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, the computing device being connected to an image capturing device, the computing device comprising:
    a storage system;
    at least one processor; and
    one or more programs stored in the storage system and executable by the at least one processor, the one or more programs comprising:
    an image obtaining module operable to capture a digital image of an object using the image capturing device, and obtain a standard image of the object from the storage system;
    an image calculation module operable to calculate a first difference value between an image average energy density (IAED) value of the digital image and an IAED value of the standard image based on RGB (red, green, blue) channels, divide the digital image into N pixel blocks (A1, A2, . . . An), divide the standard image into N pixel blocks (B1, B2, . . . Bn), and calculate a second difference value between an IAED value of each pixel block An of the digital image and an IAED value of each corresponding pixel block Bn of the standard image;
    a coefficient generation module operable to generate a threshold coefficient T for comparing the digital image and the standard image;
    an image comparison module operable to determine whether image data of the pixel block An is the same with image data of the pixel block Bn by comparing each pixel block An of the digital image with each pixel block Bn of the standard image according to the first difference value, the second difference value, and the threshold coefficient T; and
    an image generation module operable to eliminate the pixel block An from the digital image when the image data of the pixel block An is different from the image data of the pixel block Bn, and generate a discrepant image according to remaining pixel blocks of the digital image when all of the pixel blocks of the digital image are compared.

2. The computing device according to claim 1, wherein the IAED value is defined as an image energy density of each pixel of an image having N*N pixels, and is calculated according to a calculation equation IAED=(R+G+B)/N/N, wherein R represents a pixel value of a R channel, G represents a pixel value of a G channel, and B represents a pixel value of a B channel.

3. The computing device according to claim 1, wherein the first difference value comprises a difference value D_R between an IAED value of the R channel of the digital image and an IAED value of the R channel of the standard image, a difference value D_G between an IAED value of the G channel of the digital image and an IAED value of the G channel of the standard image, and a difference value D_B between an IAED value of the B channel of the digital image and an IAED value of the B channel of the standard image.

4. The computing device according to claim 3, wherein the second difference value comprises a difference value D_Rn between an IAED value of the R channel of the pixel block An and an IAED value of the R channel of the pixel block Bn, a difference value D_Gn between an IAED value of the G channel of the pixel block An and an IAED value of the G channel of the pixel block Bn, and a difference value D_Bn between an IAED value of the B channel of the pixel block An and an IAED value of the B channel of the pixel block Bn.

5. The computing device according to claim 4, wherein the image data of the pixel block An is determined as the same with the image data of the pixel block Bn, upon the condition that at least two inequality of |D_Rn|>T×|D_R|, |D_Gn|>T×|D_G|, and |D_Bn|>T× |D_B| are true, where |D_R|, |D_G|, |D_B| respectively represents an absolute value of D_R, D_G, and D_B, and |D_Rn|, |D_Gn|, |D_Bn| respectively represents an absolute value of D_Rn, D_Gn, and D_Bn respectively.

6. The computing device according to claim 1, wherein the threshold coefficient T is generated by:
predefining a minimum value x and a maximum value y of a coefficient Tn, and dividing the range x to y of Tn into S values according to a predetermined step length L to obtain a coefficient sequence (Tn1, Tn2, . . . , Tni, . . . , Tns), where the value x, y and L are respectively predefined as 2.0, 30 and 0.1;
calculating a sequence (D_m1, D_m2, . . . , D_mi, . . . , D_ms) of an amount of imaginable discrepant pixel blocks of the digital image if the digital image is divided into M pixel blocks, and creating a first pixel value sequence (Pm1, Pm2, . . . , Pmi, . . . , Pms) for the imaginable discrepant pixel blocks according to the sequence (D_m1, D_m2, . . . , D_mi, . . . , D_ms), in which D_mi=Tni×M, Pmi=D_mi×M×M;
calculating a sequence (D_n1, D_n2, . . . , D_ni, . . . , D_ns) of an amount of imaginable discrepant pixel blocks of the digital image if the digital image is divided into N pixel blocks, and creating a second pixel value sequence (Pn1, Pn2, . . . , Pni, . . . , Pns) for the imaginable discrepant pixel blocks according to the sequence (D_n1, D_n2, . . . , D_ni, . . . , D_ns), in which D_ni=Tni×n, Pmi=D_ni×N×N;
calculating a difference value D_pi between each value Pmi of the first pixel value sequence and each value Pni of the second pixel value sequence, to obtain a difference value sequence (D_p1, D_p2, . . . , D_pi, . . . , D_ps), where D_pi=Pmi−Pni; and
finding out a minimum value D_pi of the difference value sequence, and determining Tni of the coefficient sequence corresponding to the minimum value D_pi as an optimum threshold coefficient T.

7. A computerized method for identifying discrepancy of a captured image of an object using a computing device, the method comprising:
capturing a digital image of an object using an image capturing device, and obtaining a standard image of the object from a storage system of the computing device;
calculating a first difference value between an image average energy density (IAED) value of the digital image and an IAED value of the standard image based on RGB (red, green, blue) channels;
dividing the digital image into N pixel blocks (A1, A2, . . . An), and dividing the standard image into N pixel blocks (B1, B2, . . . Bn);
calculating a second difference value between an IAED value of each pixel block An of the digital image and an IAED value of each corresponding pixel block Bn of the standard image;
generating a threshold coefficient T for comparing the digital image and the standard image;
determining whether image data of the pixel block An is the same with image data of the pixel block Bn by comparing each pixel block An of the digital image with each pixel block Bn of the standard image according to the first difference value, the second difference value, and the generated threshold coefficient T;
eliminating the pixel block An from the digital image when the image data of the pixel block An is different from the image data of the pixel block Bn; and
generating a discrepant image according to remaining pixel blocks of the digital image when all of the pixel blocks of the digital image are compared.

8. The method according to claim 7, wherein the IAED value is defined as an image energy density of each pixel of an image having N*N pixels, and is calculated according to a calculation equation IAED=(R+G+B)/N/N, wherein R represents a pixel value of a R channel, G represents a pixel value of a G channel, and B represents a pixel value of a B channel.

9. The method according to claim 7, wherein the first difference value comprises a difference value D_R between an IAED value of the R channel of the digital image and an IAED value of the R channel of the standard image, a difference value D_G between an IAED value of the G channel of the digital image and an IAED value of the G channel of the standard image, and a difference value D_B between an IAED value of the B channel of the digital image and an IAED value of the B channel of the standard image.

10. The method according to claim 9, wherein the second difference value comprises a difference value D_Rn between an IAED value of the R channel of the pixel block An and an IAED value of the R channel of the pixel block Bn, a difference value D_Gn between an IAED value of the G channel of the pixel block An and an IAED value of the G channel of the pixel block Bn, and a difference value D_Bn between an IAED value of the B channel of the pixel block An and an IAED value of the B channel of the pixel block Bn.

11. The method according to claim 10, wherein the image data of the pixel block An is determined as the same with the image data of the pixel block Bn, upon the condition that at least two inequality of |D_Rn|>T×|D_R|, |D_Gn|>T×|D_G|, and |D_Bn|>T×|D_B| are true, where |D_R|, |D_G|, |D_B| respectively represents an absolute value of D_R, D_G, and D_B, and |D_Rn|, |D_Gn|, |D_Bn| respectively represents a absolute value of D_Rn, D_Gn, and D_Bn.

12. The method according to claim 7, wherein the coefficient T is generated by:
predefining a minimum value x and a maximum value y of a coefficient Tn, and dividing the range x to y of Tn into S values according to a predetermined step length L to obtain a coefficient sequence (Tn1, Tn2, . . . , Tni, . . . , Tns), where the value x, y and L are respectively predefined as 2.0, 30 and 0.1;
calculating a sequence (D_m1, D_m2, . . . , D_mi, . . . , D_ms) of an amount of imaginable discrepant pixel blocks of the digital image if the digital image is divided into M pixel blocks, and creating a first pixel value sequence (Pm1, Pm2, . . . , Pmi, . . . , Pms) for the imaginable discrepant pixel blocks according to the sequence (D_m1, D_m2, . . . , D_mi, . . . , D_ms), in which D_mi=Tni×M, Pmi=D_mi×M×M;
calculating a sequence (D_n1, D_n2, . . . , D_ni, . . . , D_ns) of an amount of imaginable discrepant pixel blocks of the digital image if the digital image is divided into N pixel blocks, and creating a second pixel value sequence (Pn1, Pn2, . . . , Pni, . . . , Pns) for the imaginable discrepant pixel blocks according to the sequence (D_n1, D_n2, . . . , D_ni, . . . , D_ns), in which D_ni=Tni×n, Pmi=D_ni×N×N;
calculating a difference value D_pi between each value Pmi of the first pixel value sequence and each value Pni of the second pixel value sequence, to obtain a difference value sequence ($D\_p1, D\_p2, \ldots, D\_pi, \ldots, D\_ps$), where $D\_pi = Pmi - Pni$; and finding out a minimum value $D\_pi$ of the difference value sequence, and determining Tni of the coefficient sequence corresponding to the minimum value $D\_pi$ as an optimum threshold coefficient T.

13. A non-transitory computer-readable medium having stored thereon instructions that, when executed by at least one processor of a computing device, causes the computing device to perform a method for identifying discrepancy of a captured image of an object, the method comprising:

capturing a digital image of an object using an image capturing device, and obtaining a standard image of the object from a storage system of the computing device;

calculating a first difference value between an image average energy density (IAED) value of the digital image and an IAED value of the standard image based on RGB (red, green, blue) channels;

dividing the digital image into N pixel blocks (A1, A2, ... An), and dividing the standard image into N pixel blocks (B1, B2, ... Bn);

calculating a second difference value between an IAED value of each pixel block An of the digital image and an IAED value of each corresponding pixel block Bn of the standard image;

generating a threshold coefficient T for comparing the digital image and the standard image;

determining whether image data of the pixel block An is the same with image data of the pixel block Bn by comparing each pixel block An of the digital image with each pixel block Bn of the standard image according to the first difference value, the second difference value, and the generated threshold coefficient T;

eliminating the pixel block An from the digital image when the image data of the pixel block An is different from the image data of the pixel block Bn; and generating a discrepant image according to remaining pixel blocks of the digital image when all of the pixel blocks of the digital image are compared.

14. The non-transitory computer-readable medium according to claim 13, wherein the IAED value is defined as an image energy density of each pixel of an image having N*N pixels, and is calculated according to a calculation equation IAED=(R+G+B)/N/N, wherein R represents a pixel value of a R channel, G represents a pixel value of a G channel, and B represents a pixel value of a B channel.

15. The non-transitory computer-readable medium according to claim 13, wherein the first difference value comprises a difference value $D\_R$ between an IAED value of the R channel of the digital image and an IAED value of the R channel of the standard image, a difference value $D\_G$ between an IAED value of the G channel of the digital image and an IAED value of the G channel of the standard image, and a difference value $D\_B$ between an IAED value of the B channel of the digital image and an IAED value of the B channel of the standard image.

16. The non-transitory computer-readable medium according to claim 15, wherein the second difference value comprises a difference value $D\_Rn$ between an IAED value of the R channel of the pixel block An and an IAED value of the R channel of the pixel block Bn, a difference value $D\_Gn$ between an IAED value of the G channel of the pixel block An and an IAED value of the G channel of the pixel block Bn, and a difference value $D\_Bn$ between an IAED value of the B channel of the pixel block An and an IAED value of the B channel of the pixel block Bn.

17. The non-transitory computer-readable medium according to claim 16, wherein the image data of the pixel block An is determined as the same with the image data of the pixel block Bn, upon the condition that at least two inequality of $|D\_Rn|>T\times|D\_R|$, $|D\_Gn|>T\times|D\_G|$, and $|D\_Bn|>T\times|D\_B|$ are true, where $|D\_R|$, $|D\_G|$, $|D\_B|$ respectively represents an absolute value of $D\_R$, $D\_G$, and $D\_B$, and $|D\_Rn|$, $|D\_Gn|$, $|D\_Bn|$ respectively represents a absolute value of $D\_Rn$, $D\_Gn$, and $D\_Bn$.

18. The non-transitory computer-readable medium according to claim 13, wherein the coefficient T is generated by:

predefining a minimum value x and a maximum value y of a coefficient Tn, and dividing the range x to y of Tn into S values according to a predetermined step length L to obtain a coefficient sequence (Tn1, Tn2, ..., Tni, ..., Tns), where the value x, y and L are respectively predefined as 2.0, 30 and 0.1;

calculating a sequence ($D\_m1, D\_m2, \ldots, D\_mi, \ldots, D\_ms$) of an amount of imaginable discrepant pixel blocks of the digital image if the digital image is divided into M pixel blocks, and creating a first pixel value sequence (Pm1, Pm2, ..., Pmi, ..., Pms) for the imaginable discrepant pixel blocks according to the sequence ($D\_m1, D\_m2, \ldots, D\_mi, \ldots, D\_ms$), in which $D\_mi = Tni \times M$, $Pmi = D\_mi \times M \times M$;

calculating a sequence ($D\_n1, D\_n2, \ldots, D\_ni, \ldots, D\_ns$) of an amount of imaginable discrepant pixel blocks of the digital image if the digital image is divided into N pixel blocks, and creating a second pixel value sequence (Pn1, Pn2, ..., Pni, ..., Pns) for the imaginable discrepant pixel blocks according to the sequence ($D\_n1, D\_n2, \ldots, D\_ni, \ldots, D\_ns$), in which $D\_ni = Tni \times n$, $Pmi = D\_ni \times N \times N$;

calculating a difference value $D\_pi$ between each value Pmi of the first pixel value sequence and each value Pni of the second pixel value sequence, to obtain a difference value sequence ($D\_p1, D\_p2, \ldots, D\_pi, \ldots, D\_ps$), where $D\_pi = Pmi - Pni$; and finding out a minimum value $D\_pi$ of the difference value sequence, and determining Tni of the coefficient sequence corresponding to the minimum value $D\_pi$ as an optimum threshold coefficient T.

* * * * *